US011656125B2

(12) United States Patent
Bounaix et al.

(10) Patent No.: US 11,656,125 B2
(45) Date of Patent: May 23, 2023

(54) PORTABLE OPTICAL SPECTROSCOPY DEVICE FOR ANALYZING GAS SAMPLES

(71) Applicant: Q.E.D. ENVIRONMENTAL SYSTEMS LIMITED, Coventry (GB)

(72) Inventors: Fabrice Marcel Serge Bounaix, Weyersheim (FR); Antonio Cortina, Besenello (IT); Gabriele Finardi, Lagundo (IT)

(73) Assignee: Q.E.D. ENVIRONMENTAL SYSTEMS LIMITED, Coventry (GB)

( * ) Notice: Subject to any disclaimer, the term of this patent is extended or adjusted under 35 U.S.C. 154(b) by 0 days.

(21) Appl. No.: 17/257,526

(22) PCT Filed: Jun. 26, 2019

(86) PCT No.: PCT/EP2019/067030
§ 371 (c)(1),
(2) Date: Dec. 31, 2020

(87) PCT Pub. No.: WO2020/007684
PCT Pub. Date: Jan. 9, 2020

(65) Prior Publication Data
US 2021/0164837 A1     Jun. 3, 2021

(30) Foreign Application Priority Data

Jul. 4, 2018 (EP) .................................... 18181731

(51) Int. Cl.
*G01J 3/433* (2006.01)
*G01J 3/02* (2006.01)
(Continued)

(52) U.S. Cl.
CPC ............. *G01J 3/433* (2013.01); *G01J 3/0272* (2013.01); *G01J 3/0283* (2013.01);
(Continued)

(58) Field of Classification Search
CPC ........ G01J 3/433; G01J 3/0272; G01J 3/0283; G01N 21/031; G01N 21/3504;
(Continued)

(56) References Cited

U.S. PATENT DOCUMENTS 4,818,100 A * 4/1989 Breen ..................... G01S 17/87
356/141.5
7,616,316 B1   11/2009 Silver et al.
(Continued)

FOREIGN PATENT DOCUMENTS

DE    102016010088 A1   3/2018
EP        3287767 A1    2/2018

OTHER PUBLICATIONS

International Preliminary Report on Patentability dated Jan. 14, 2021, for corresponding PCT Application No. PCT/EP2019/067030.
(Continued)

*Primary Examiner* — Jamil Ahmed
(74) *Attorney, Agent, or Firm* — Kinney & Lange, P.A.

(57) ABSTRACT

A portable optical spectroscopy device is disclosed for analyzing gas samples and/or for measurement of species concentration, number density, or column density. The device includes a measuring chamber with the gas sample to be analyzed, a light source with at least one laser diode for emitting a laser beam along a light path running through the measuring chamber at least in certain regions, means for modulating the wavelength of the light beam emitted by the light source, and an optical detector device having a first optical detector and at least one second optical detector. At least a part of the light emitted by the laser diode is detected after the light has passed through the measuring chamber m-times, and at least a part of the light emitted by the laser diode is detected with the at least one second optical detector (Continued)

after the light has passed through the measuring chamber n-times, where n>m applies.

17 Claims, 2 Drawing Sheets

(51) Int. Cl.
  *G01N 21/03* (2006.01)
  *G01N 21/3504* (2014.01)
  *G01N 21/39* (2006.01)
(52) U.S. Cl.
  CPC ....... *G01N 21/031* (2013.01); *G01N 21/3504* (2013.01); *G01N 21/39* (2013.01); *G01N 2021/399* (2013.01); *G01N 2201/0221* (2013.01); *G01N 2201/0612* (2013.01)
(58) Field of Classification Search
  CPC ............. G01N 21/39; G01N 2021/399; G01N 2201/0221; G01N 2201/0612
  See application file for complete search history.

(56) References Cited

U.S. PATENT DOCUMENTS

| | | | | |
|---|---|---|---|---|
| 7,710,568 | B1* | 5/2010 | Paige | G01J 3/0272 356/73 |
| 2006/0119851 | A1* | 6/2006 | Bounaix | G01N 21/61 356/437 |
| 2010/0140478 | A1* | 6/2010 | Wilson | G01N 21/3504 250/339.13 |
| 2011/0299084 | A1* | 12/2011 | Feitisch | G01N 21/031 356/433 |
| 2013/0321815 | A1* | 12/2013 | Otera | G01J 3/433 356/437 |
| 2013/0341502 | A1* | 12/2013 | Cowie | G01N 21/39 250/252.1 |
| 2014/0204382 | A1 | 7/2014 | Christensen | |
| 2017/0139182 | A1 | 5/2017 | Sawyers | |

OTHER PUBLICATIONS

International Search Report and Written Opinion dated Sep. 9, 2019, for corresponding PCT Application No. PCT/EP2019/067030.

\* cited by examiner

PORTABLE OPTICAL SPECTROSCOPY DEVICE FOR ANALYZING GAS SAMPLES

CROSS-REFERENCE TO RELATED APPLICATION(S)

This application is the national phase of PCT Application No. PCT/EP2019/067030 filed on Jun. 26, 2019, which in turn claims priority to European Application No. 18181731.3 filed on Jul. 4, 2018, both of which are incorporated by reference herein in their entireties.

TECHNICAL FIELD

The present disclosure relates to gas concentration measurement and more specifically to a portable detector that measures gas concentration.

In particular, the present disclosure relates to a portable optical spectroscopy device for analyzing gas samples and/or for measurement of species concentration, number density, or column density, and to a portable optical spectroscopy method for measurement of species concentration, number density, or column density.

BACKGROUND

Walking inspection surveys for finding natural gas leaks are currently performed with a surveyor moving at a normal gait while dragging a leak detector along the ground. The surveyor pauses to further investigate an area only if the instrument alarms. Often, a low ppm plume is the sole initial indication of a leak. Thus, a useful instrument for this particular application must respond within approximately one to two seconds, be sensitive to 1 ppm changes in ambient methane concentration, and not alarm falsely. Once a leak is located, an ideal instrument could measure up to pure gas levels in order to further quantify the magnitude of the leak and the urgency required for corrective action.

Low weight, the ability to run for a full eight hour workday, and intrinsic safety are also desirable instrument characteristics for this specific application.

There is a need for an instrument that meets all of the criteria stated above. Typically, a combination of instruments is used to accomplish leak surveying. Specifically, no instrument responds rapidly, continuously draws samples, and measures from ambient methane levels (approximately 1.7 ppm) to pure gas. For example, flame ionization detectors, which are commonly used in walking area surveys to find leaking gas, typically can detect a maximum concentration of 5,000 ppm. These detectors are not intrinsically safe since they use fuel mixtures composed with approximately 40% hydrogen gas and have an internal flame. For higher gas concentrations, a combustible gas indicator is typically used. These thermal conductivity sensors measure from the lower explosion limit (5% gas) to pure gas levels. They do not make continuous measurements and require hand aspiration with a squeeze bulb.

Moreover, all conventional gas leak detectors are responsive to any hydrocarbon and are not selective to methane. Nonselective detection is problematic in areas where other hydrocarbons may be present.

SUMMARY

A primary object of the present disclosure is to measure optical absorbances over large dynamic ranges.

Another object of the disclosure is to make possible inexpensive natural gas leak detectors capable of quantitative methane concentration measurements between normal atmospheric background values and 100%.

Another object of the disclosure is to replace existing natural gas leak detection systems that require a plurality of measurement devices with a single device.

Another object of the disclosure is to replace flame ionization detectors that pose an explosion hazard with sensors and analyzers that are safer and can be made intrinsically safe.

Another object of the disclosure is to make possible inexpensive gas sensors and analyzers capable of concentrations measurements over a wide dynamic range.

Other objects, advantages and novel features, and further scope of applicability of the present disclosure will be set forth in part in the detailed description to follow, taken in conjunction with the accompanying drawings, and in part will become apparent to those skilled in the art upon examination of the following, or may be learned by practice of the disclosure. The objects and advantages of the disclosure may be realized and attained by means of the instrumentalities and combinations particularly pointed out in the appended claims.

The present disclosure is of methods and devices for quantitative measurement of species concentration, number density, or column density over an extensive range using optical spectroscopy and a sample region of different optical path lengths. The measured species can be methane.

Two or more spectroscopic methods are used to cover the full measurement dynamic range. A first spectroscopic method is selected for high sensitivity quantitative absorbance measurements for low species' concentrations (e.g. up to approximately 1,000 ppm if the species is methane). A second method spans species' concentrations in the range of approximately 300 ppm to approximately 3,0000 ppm (if the species is methane). A third method may be employed to cover an intermediate species' concentration range between, for example, 20,000 ppm to 200,000 ppm (for methane). A fourth spectroscopic method is selected for absorbance measurements for high species' concentrations (e.g. in the range of approximately 150,000 ppm to approximately 1,000,000 ppm if the species is methane).

Spectroscopic method selection and corresponding control of the spectroscopic light source and processing of the detector output are performed by a microcontroller specifically programmed for these tasks. The microcontroller implemented algorithm includes selection points that determine when to switch between methods. Hysteresis in switching points prevents oscillation between methods as sample absorbances cross a transition point. This disclosure prefers a multiple optical path and all spectroscopic methods may measure the same absorption feature or different absorption features.

According to some embodiments of the present disclosure, the device has a plurality of operational modes measuring a same absorption feature or different absorption features of the same species, wherein the device switches between modes depending on measured absorbance.

A first operational mode may be selected from the group consisting of wavelength modulation spectroscopy, frequency modulation spectroscopy, two-tone frequency modulation spectroscopy, cavity ringdown spectroscopy, and rapid-scan direct absorption spectroscopy. A second operational mode may determine absorbance from a measurement of width of the absorption feature. A third operational mode may comprise direct absorption spectroscopy. A fourth operational mode may determine absorbance from a measurement of width of the absorption feature performed by the first optical detector and the at least one second optical detector. A fifth operational mode may determine absorbance from a measurement of width of the at least one absorption feature at different wavelengths tuned to different absorption lines of a species to be detected in the gas sample.

Useful spectroscopic light sources include but are not limited to lasers such as wavelength tunable lasers such as diode lasers (including external cavity diode lasers), dye lasers, and optically pumped solid-state lasers (including diode pumped solid state lasers); light sources obtained using non-linear optical methods such as difference frequency generation, sum frequency generation, harmonic generation, and optical parametric oscillation; broad band light sources such as lamps, light emitting diodes and thermal emitters in combination with wavelength selection optics such as gratings, prisms, and interferometric devices.

According to the present disclosure, however, the at least one laser diode of the light source is a low-power semiconductor laser diode, in particular a vertical-cavity surface-emitting laser diode. In this regard, the device is designed to minimize the occurrence and limit the severity of accidental explosions such that the device can be used in explosive atmospheres. A vertical-cavity surface-emitting laser diode is a type of semiconductor laser diode with laser beam emission perpendicular from the top surface, contrary to conventional edge-emitting semiconductor lasers (also in-plane lasers) which emit from surfaces formed by cleaving the individual chip out of a wafer.

According to one aspect of the present disclosure, the device comprises an internal power source certified for use in potentially explosive atmospheres. For example, the internal power source may have at least one preferably rechargeable battery and a battery enclosure for use in a hazardous area. The battery enclosure may be a rugged stainless steel rechargeable battery enclosure.

The disclosed device preferably comprises a power circuit with intrinsic safety technology for safe operation of the electrical equipment of the device in hazardous areas by limiting the energy, electrical and thermal, available for ignition. The signal and control circuits of the disclosed device are designed such that they can operate with low currents and voltages.

An embodiment of the present disclosure meets all the requirements for natural gas leak surveying. It measures all methane levels from ambient concentration (approximately 1.7 ppm) to pure gas and can be applied in areas requiring an ATEX certification. The device incorporates an advanced low power semiconductor sensor comprising a vertical-cavity surface-emitting laser diode to measure combustible gases, in particular methane. The device is approved for the ATEX Directive EN60079-0:2004 & EN60079-11:2007 and comprises a corresponding battery design for ATEX compliance. This battery design preferably comprises a 3.65 V high energy Li-ion cell having a nominal voltage of 3.75 V at 1 A rate at 20° C., and a typical capacity of 4.0 Ah (at 1 A, 20° C., 2.5 V cut-off).

According to some embodiments of the present disclosure, the battery design comprises at least one rechargeable Li-ion cell having a graphite-based anode, a Lithium Cobalt oxide-based cathode, organic solvents as electrolyte, and built-in redundant safety protections (shutdown separator, circuit breaker, safety vent).

The battery design may comprise a plurality of lithium-ion cells that are mechanically and electrically integrated into a battery system. The battery system includes electronic devices for performance, thermal and safety management such as to incorporate several levels of redundant safety features to prevent abuse conditions such as over-charge, over-discharge, and short circuits.

According to some embodiments disclosed herein, each of the lithium-ion cell of the battery design comprises a can, in particular, an aluminum can, and a cover, in particular an aluminum cover, wherein the positive and negative terminals of the lithium-ion cell project from the cover. Moreover, a protective cover is provided in order to cover the cover of the lithium-ion cell and, in particular, the positive and negative terminals of the lithium-ion cell. In this way, the top part of the lithium-ion cell and, in particular, the positive and negative terminals of the lithium-ion cell are encapsulated thereby increasing ATEX compliance.

The first and at least one second detectors are spectrometer detectors that are configured to convert in a well-defined manner light beam intensity to a voltage or current, and has a response time suitable for all spectroscopic methods used by the spectrometer. Suitable detectors include but are not limited to photodiodes and photomultipliers.

An embodiment of the present disclosure meets all the requirements for natural gas leak surveying. It measures all methane levels from ambient concentration (approximately 1.7 ppm) to pure gas. One embodiment of the present disclosure is preferably selective to methane and detects no other hydrocarbons. In other words, other gases do not effect the measurement of methane when using this embodiment. The one second time response of this embodiment allows it to be used in rapid walking area surveys. Embodiments of this disclosure also use no consumables and is constructed to be intrinsically safe.

According to some embodiments of the present disclosure, a portable optical spectroscopy device for analyzing gas samples and/or for measurement of species concentration, number density, or column density is provided. The device comprises a measuring chamber with the gas sample to be analyzed; a light source with at least one laser diode for emitting a laser beam along a light path running through the measuring chamber at least in certain regions; means for modulating the wavelength of the light beam emitted by the light source; an optical detector device having a first optical detector and at least one second optical detector, the first and the at least one second optical detector being arranged with respect to the laser diode such that with the first optical detector at least a part of the light emitted by the laser diode is detected after the light has passed through the measuring chamber m-times, and at least a part of the light emitted by the laser diode is detected with the at least one second optical detector after the light has passed through the measuring chamber n-times, where n>m applies; and an evaluation unit for evaluating a signal characteristic output by the first optical detector and/or a signal characteristic output by the at least one second detector.

The evaluation unit may comprise signal-processing electronics for acquiring data from the first and the at least one second optical detector and for establishing linelocking and a comparative signal source of at least one absorption feature, and a microcontroller receiving said data from said signal processing electronics.

According to some aspects of the present disclosure, the device additionally comprises a display for displaying said data from said microcontroller, wherein said display can switch between displaying said data in PPM, percent LEL and percent gas. In addition, alarms controlled by said microcontroller may be provided. In some embodiments of the present disclosure, a user button for inputting options and modes is further provided.

Moreover, the device may comprise a reference cell in which at least one species is contained which is to be detected in the gas sample to be analyzed, wherein the reference cell is designed such that at least a part of the light emitted by the laser diode passes through the reference cell after the light has passed through the measuring chamber and before the light is detected by the first optical detector.

According to some embodiments of the present disclosure, the first optical detector and/or the at least one second optical detector are/is optionally operable for the harmonic detection of the light emitted by the laser diode or for the direct detection of the light emitted by the laser diode. The evaluation unit may comprise at least one phase detector for a phase-locked loop circuit allocated to the first optical detector and/or the at least one second optical detector.

According to some embodiments of the present disclosure, the at least one laser diode is adapted to selectively emit light in a first frequency spectrum or light in at least one second frequency spectrum, wherein the first frequency spectrum is matched to a first absorption line of a species to be detected in the gas sample to be analyzed, and wherein the second frequency spectrum is matched to a second absorption line of the species, wherein the first absorption line is stronger than the second absorption line.

According to some embodiments of the present disclosure, the evaluation unit is operable:

in a first operating mode, in which the at least one second optical detector is operated for the harmonic detection of the light emitted by the laser diode and the signal path recorded by the at least one second optical detector is evaluated;

in a second operating mode, in which the at least one second optical detector is operated for the direct detection of the light emitted by the laser diode and the signal path recorded by the at least one second optical detector is evaluated;

in a third operating mode, in which the first optical detector is operated for the direct detection of the light emitted by the laser diode and the signal path recorded by the first optical detector is evaluated; and in a fourth operating mode in which the at least one laser diode is driven in such a way that this light emits in a frequency spectrum which is tuned to an absorption line of a species to be detected in the gas sample to be analyzed, wherein this absorption line is weaker than the absorption line, onto which the frequency spectrum of the light emitted by the at least one laser diode is in the first to third operating mode, and wherein in the fourth operating mode the at least one second optical detector is optionally operated for harmonic or direct detection of the light emitted by the at least one laser diode and the signal course recorded by the at least one second optical detector is evaluated.

In yet another embodiment of the present disclosure, the measuring chamber comprises a multiple pass optical cell. In this embodiment, a pump continuously pumps gas through the multiple pass optical cell. The cell preferably comprises two mirrors configured in a Herriott cell design.

In a further embodiment of the present disclosure, the light source of the portable optical spectroscopy device comprises a diode laser, preferably a semiconductor laser diode known as "vertical-cavity surface-emitting laser" (VCSEL) with laser beam emission perpendicular from the top surface, contrary to conventional edge-emitting semiconductor lasers (also in-plane lasers) which emit from surfaces formed by cleaving the individual chip out of a wafer.

A display is optionally included for displaying data from the microcontroller. The display preferably switches between displaying data in PPM, percent LEL and percent gas. Alarms are included in this embodiment. The alarms are controlled by the microcontroller. A user button is optionally included for inputting options and modes.

In another embodiment of the present disclosure, the apparatus comprises a telescoping sample probe and is powered using batteries, in particular Li-Ion batteries as indicated above.

A portable optical spectroscopy method for measurement of species concentration, number density, or column density comprises the steps of holding a portable optical spectroscopy device in an area to be measured, preferably holding the device in a single hand, emitting light from the light source of the portable optical spectroscopy device through the measuring chamber of the device, receiving light via the first optical detector and the at least one second optical detector of the device, and evaluating a signal characteristic output by the first optical detector and the at least one second optical detector of the device. The device has a plurality of operational modes measuring a same absorption feature or different absorption features of the species and wherein said device switches between modes depending on measured absorbance.

The method preferably further comprises the step of determining one or more gas concentrations via signal processing electronics connected to the detector, and reporting the gas concentration data to a microcontroller. The gas being measured is preferably methane.

The method preferably comprises employing signal-processing electronics to establish linelocking and a comparative signal source of the absorption feature.

The method optionally comprises a multiple pass optical cell. A diode laser is preferably used as the light source. The method further continuously pumps the gas to be detected through the multiple pass optical cell. In this embodiment, the multiple pass optical cell preferably comprises two mirrors configured in a Herriott cell design.

The method also preferably displays the gas concentration data, controls alarms via the microcontroller, performs a calibration, inputs options and modes via a user button, and telescopes a sample probe in the area to be measured.

Other objects, advantages and novel features, and further scope of applicability of the present disclosure will be set forth in part in the detailed description to follow, taken in conjunction with the accompanying drawings, and in part will become apparent to those skilled in the art upon examination of the following, or may be learned by practice of the disclosure.

BRIEF DESCRIPTION OF THE DRAWINGS

The accompanying drawings, which are incorporated into and form a part of the specification, illustrate one or more embodiments of the present disclosure and, together with the description, serve to explain the principles of the disclosure. The drawings are only for the purpose of illustrating one or more preferred embodiments of the disclosure and are not to be construed as limiting the disclosure.

In the drawings.

DETAILED DESCRIPTION

The present disclosure is directed to a portable optical spectroscopy device for analyzing gas samples and/or for measurement of species concentration. In particular, the disclosure relates to a portable gas leak detector. In a preferred embodiment, the portable gas leak detector is a diode laser sensor that determines gas concentration, preferably methane concentration.

Figure 1:
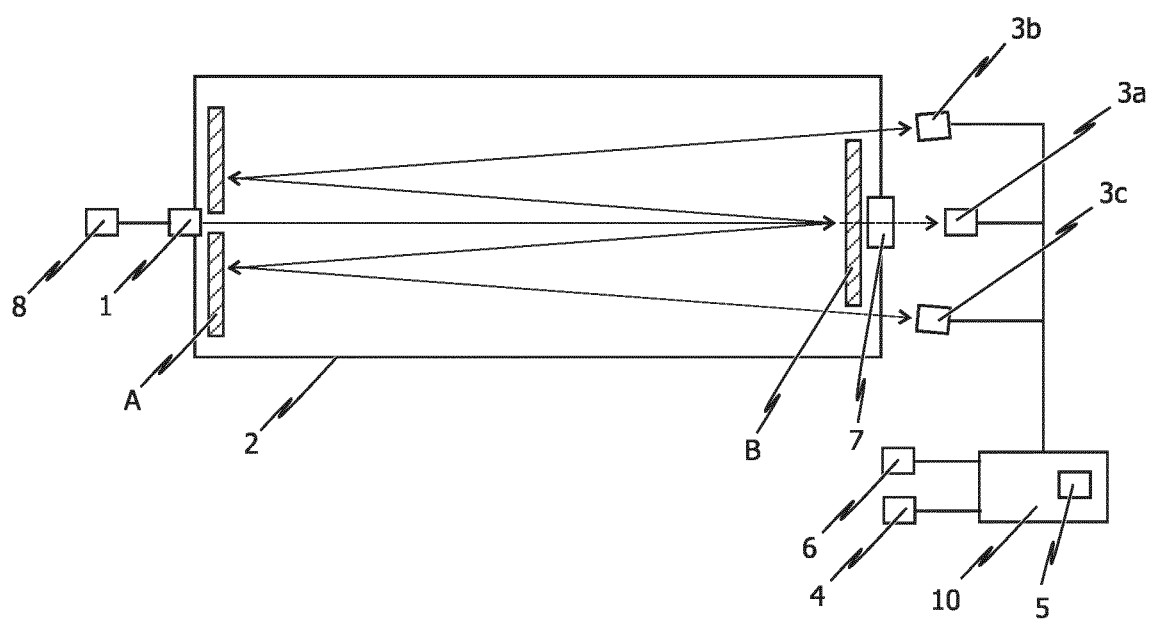
FIG. 1 is a schematic drawing of an embodiment of the present disclosure preferred for the use in methane detection.

A schematic of an embodiment of the present disclosure is illustrated in FIG. 1. This embodiment preferably comprises a portable optical spectroscopy device for measurement of gas concentration. The device is preferably a handheld device.

The optical spectroscopy device preferably comprises laser light source 1 having at least one laser diode and a fixed length optical path which receives light from the at least one laser diode. The fixed length optical path contains a gas to be detected and preferably comprises multiple pass optical cell or measuring chamber 2. The gas to be detected is preferably pumped continuously through multiple pass optical cell or measuring chamber 2 using a pump.

A first optical detector 3a preferably receives light at an end of the fixed length optical path, after the light passes through the gas to be detected one times. Second optical detectors 3b, 3c receive light at an end of the fixed length optical path, after the light passes through the gas to be detected several times.

The first and second optical detectors 3a, 3b, 3c are connected to signal processing electronics 4. Signal processing electronics 4 determines one or more gas concentrations. Microcontroller 5 preferably receives the concentration data from signal processing electronics 4, and displays the concentration data using a display 6. The display 6 can preferably display the gas concentration data in PPM, percent LEL and/or percent gas.

This embodiment also preferably comprises a reference signal for linelocking and comparing signal sources. To establish a reference signal, this embodiment preferably comprises a reference cell 7 in which at least one species is contained which is to be detected in the gas sample to be analyzed. The reference cell 7 is designed such that at least a part of the light emitted by the laser light source 1 passes through the reference cell 7 after the light has passed through the measuring chamber 2 and before the light is detected by the first optical detector 3a.

According to this design, the first optical detector 3a also serves for receiving light from the reference cell 7. Since the first optical detector 3a is connected to signal processing electronics 4 which determines concentration of the reference signal based on the amount of the optical detector detects. The reference cell 7 preferably comprises approximately a methane mixture with an optical absorbance of 0.001 to 0.1.

The first optical detector 3a and the second optical detectors 3b, 3c are optionally operable for the harmonic detection of the light emitted by the laser diode or for the direct detection of the light emitted by the laser diode.

The at least one laser diode is preferably adapted to selectively emit light in a first frequency spectrum or light in at least one second frequency spectrum, wherein the first frequency spectrum is matched to a first absorption line of a species (here: methane) to be detected in the gas sample to be analyzed, and wherein the second frequency spectrum is matched to a second absorption line of the species (here: methane), wherein the first absorption line is stronger than the second absorption line.

For analyzing and evaluating the data provided by the first and second optical detectors 3a, 3b, 3c, the device comprises an evaluation unit 10. The evaluation unit 10 preferably comprises the already mentioned signal-processing electronics 4 for acquiring data from the first optical detector 3a and the second optical detectors 3b, 3c and for establishing linelocking and a comparative signal source of at least one absorption feature. Moreover, the evaluation unit 10 preferably comprises the already mentioned microcontroller 5 receiving said data from said signal processing electronics 4. For displaying said data from said microcontroller, a display 6 is provided. The display 6 can preferably switch between displaying said data in PPM, percent LEL and percent gas.

The evaluation unit 10 is operable:

in a first operating mode, in which the second optical detectors 3b, 3c are operated for the harmonic detection of the light emitted by the laser diode and the signal path recorded by the second optical detectors 3b, 3c is evaluated;

in a second operating mode, in which the second optical detectors 3b, 3c are operated for the direct detection of the light emitted by the laser diode and the signal path recorded by the second optical detectors 3b, 3c is evaluated;

in a third operating mode, in which the first optical detector 3a is operated for the direct detection of the light emitted by the laser diode and the signal path recorded by the first optical detector 3a is evaluated; and in a fourth operating mode in which the at least one laser diode is driven in such a way that this light emits in a frequency spectrum which is tuned to an absorption line of a species (here: methane) to be detected in the gas sample to be analyzed, wherein this absorption line is weaker than the absorption line, onto which the frequency spectrum of the light emitted by the at least one laser diode is in the first to third operating mode, and wherein in the fourth operating mode the at least one second optical detector is optionally operated for harmonic or direct detection of the light emitted by the at least one laser diode and the signal course recorded by the second optical detectors 3b, 3c is evaluated.

In accordance with the present disclosure, a diode laser sensor measures an optical absorption for a methane concentration. The optical absorption is preferably at a wavelength corresponding to a methane absorption line between 1,630 and 1,700 nm. At the specified wavelength, methane has a very narrow absorbance where there are typically no interfering species to absorb. A high sensitivity optical absorption technique known as wavelength modulation spectroscopy and an enclosed multiple pass optical cell are preferably used to obtain sub-ppm sensitivity.

At higher concentrations, where the optical absorption becomes thick, conventional absorption spectroscopy is preferably used. In this embodiment, the methane is continuously drawn through the multiple pass optical cell with a small pump.

In yet another embodiment of the present disclosure, the light source 1 is preferably a diode laser. Laser characteristics preferably comprise approximately 0.1 to 5 mW output power, approximately 5 to 150 mA diode injection current, and approximately 0.5 to 3 V diode drop.

The at least one laser diode is preferably mounted directly on a miniature thermoelectric cooler, which allows for thermal control while minimizing power consumption.

Multiple pass optical cell or measuring chamber 2 preferably comprises two mirrors A, B configured in a Herriott cell design. This design makes the system insensitive to mechanical vibration. More preferably, the base path of multiple pass optical cell or measuring chamber 2 is approximately 5 to 20 cm and the total fixed length optical path provided by multiple pass optical cell or measuring chamber 2 is approximately 50 to 500 cm. In this embodiment, the volume of the measuring chamber 2 is approximately to 50 ml. The pumping speed through the measuring chamber 2 is approximately 5 to 50 ml/sec.

In an embodiment of the present disclosure, a portion of the laser beam is split off via a partially transmissive reflector (mirror B) prior to entering the first optical detector 3a.

Below concentrations of approximately 1,000 ppm, at least one of the second optical detectors 3b, 3c and wavelength modulation spectroscopy is preferably employed. A high sensitivity is obtained by conducting spectral measurements at a frequency high enough to greatly reduce laser excess noise. The technique is implemented by rapidly modulating the laser wavelength and performing phase sensitive photodetection at a harmonic of the modulation frequency.

Since a diode laser's wavelength tunes with injection current, a small periodic oscillation of the diode laser current results in wavelength modulation. The gas absorption converts the wavelength modulation to an amplitude modulation of the transmitted beam. A relatively slow sweep of the laser wavelength (current) across the spectral region generates a spectrum. The spectrum resulting from nth harmonic detection appears as the nth derivative of the unmodulated absorbance. In the sensor, second harmonic detection is preferably used. Because diode lasers are generally linear in intensity versus wavelength, second harmonic detection has the added benefit of being a zero baseline measurement. The amplitude of the spectral peak is proportional to absorbance and thus, through Beer's law, proportional to concentration. The peak amplitude is also linear with respect to the beam intensity. Thus, signals are normalized by the light intensity.

At gas concentrations between approximately 150,000 ppm and approximately 1,000,000 ppm, the sample becomes optically thick. In this region, a modified form of absorbance spectroscopy is performed.

According to embodiments disclosed herein, the modified form of absorbance spectroscopy is performed by means of at least one second optical detector, wherein the laser is not modulated; however, wherein the at least one laser diode is driven in such a way that it emits light in a frequency spectrum which is tuned to an absorption line of the species (here: methane) to be detected in the gas sample to be analyzed, wherein this absorption line is weaker than the absorption line, onto which the frequency spectrum of the light emitted by the at least one laser diode is in the other operating modes.

In one embodiment of the present disclosure, the device is further provided with a GPS system for allocating a position to the methane spectra evaluated by the device.

User button allows a user to answer yes/no questions regarding instrument options and modes. This embodiment preferably comprises alarms that are controlled by microcontroller preferably include an audible alarm, a vibrating buzzer, an LED, and an audio headset alarm.

An embodiment of the present disclosure comprises a casing around the instrument. The casing is preferably plastic. An inlet tube is preferably used as a sample probe. More preferably a telescoping inlet tube is used as a sample probe Most preferably, a telescoping inlet tube with a 5 micron filter attached near the input is used as a sample probe. The sample probe preferably connects to multiple pass optical cell or measuring chamber 2. In normal leak surveying, the end of the probe is dragged along the ground.

A rigid probe can optionally be attached to the sample probe for detection of gases underground. The rigid probe enables a user to easily detect gases underground. The present disclosure requires only single-handed operation when used in this manner. A clogged filter warning is provided when the inlet pressure drops significantly below ambient pressure.

The disclosure preferably runs using a wireless energy source, such as batteries. More preferably, the present disclosure runs on four AA size rechargeable nickel metal hydride or preferably Lithium Ion batteries.

In one embodiment of the present disclosure, a calibration, preferably a two point calibration, performed by a user in order to establish span and offset factors. In this embodiment, one calibration point is performed on clean air. The other calibration point is performed on approximately 1,000 ppm methane mixture in air or nitrogen. The calibration mixture is introduced into the instrument using a demand flow regulator. A demand flow regulator feeds gas to the system at the pumping speed, thereby keeping the sample pressure from changing. The calibration is performed in both wavelength modulation and normal absorbance modes. Calibration can be performed as little as once a month.

Figure 2:
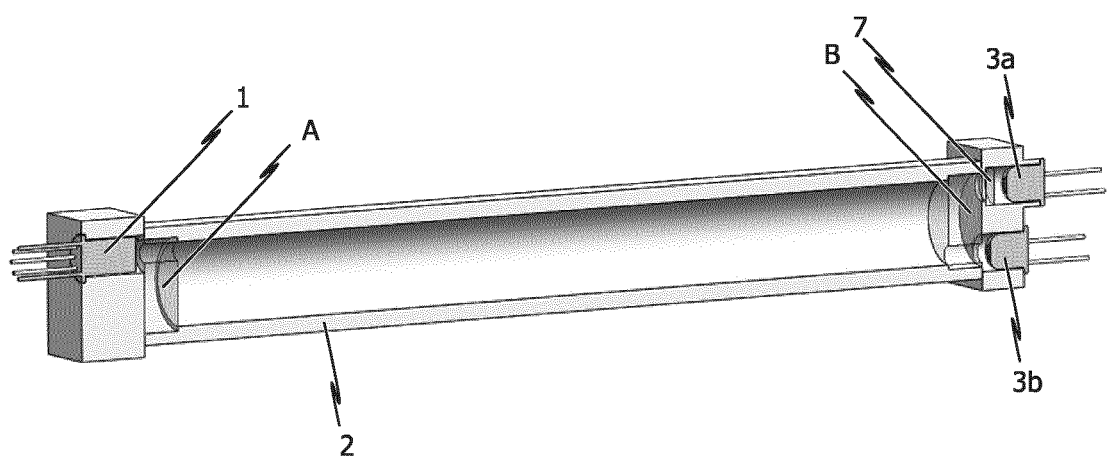
FIG. 2 is a cross-sectional view of a measuring chamber of an embodiment of the present disclosure.

FIG. 2 shows an exemplary embodiment of the measuring chamber 2 of the disclosed device previously discussed with reference to the schematic illustration in FIG. 1.

The portable device for gas leak detection, consists mainly in a "laser sensor", a pump to sample the gaseous mixture to analyses, a Li-Ion cell, a graphical LCD to show the measure and interact, key+rotating knob, embedded GPS and BlueTooth and electronic board to manage all the above.
The laser sensor can be divided into an optical part and the measuring electronic.

The principle behind the selective measure of methane is TDLAS, used with both direct absorption and "second derivative—2F" techniques. Laser used is a VCSEL at appropriate wavelength of approximately 1.654 nm.

The optical cell consists in a tube (cell tube) which contains the gaseous mixture to be measured and also provide mechanical support function. The cell is constantly injected with the gas sampled by the pump. At both ends of the tube there are two concave custom built mirror (mirror A, mirror B) which forms a multipass cell that provide an optical length of approximately 3.3 meters.

On one end is located the laser emitter (laser) with specific lens to give optimal focus to the laser beam. On the opposite end are located two photodiodes, one is the "reference" and one is the "measure".

Reference photodiode (first optical detector 3a) is placed after the first pass of the laser beam, so it's optical path length is the mechanical length of the cell (approximately 13 cm). The mirror on this end (mirror B) is manufactured to have a small quantity of transmission of approximately 1%, so it is possible to have some light hitting the photodiode. Also before the photodiode and after the mirror is present a closed portion of dedicated metallic pipe which forms a cell in which is present a mixture of gas with a relevant amount of CH4 to have a reference absorption line to keep the system locked to the absorption peak.

Measure photodiode (second optical detector) is placed at the end of the multipass optical path.

This configuration determines that is possible to measure with two photodiodes at the same time, one at the long path length and one at the short.

The electronic that manage the laser sensor incorporates what is needed to have the regulation of the laser (thermal stability, laser driving) and to measure in direct absorption and in second derivative. It generates DC bias, ramp and primary RF frequency generation, and acquire photodiode signal in DC (direct absorption) and also through lock-in amplifier for the second derivative measurement.

Due to the optical path length and the required detection limit and full range of measure it's impossible to produce a measure from a single channel that can cover the whole range of measure (0.1 ppm to 1,000,000 ppm) so a strategy to manage those signal was implemented, so it is possible to identify four stage of measure:

LOW RANGE:
up to approximately 1,000 ppm, uses the full optical path and works in second derivative MID LOW RANGE:
from approximately 300 ppm to approximately 30,000 ppm, uses the full optical path and works in direct absorption MID HIGH RANGE:
from approximately 20,000 ppm to approximately 200,000 ppm, uses the single pass and works in direct absorption; in this mode is present a constant absorption due to the presence of the reference cell 7, so the calibration need to take into account this aspect HIGH RANGE:
from approximately 150,000 ppm to approximately 1,000,000 ppm, uses the full optical path and works in direct absorption, but the laser emission is switched to a nearby weaker absorption line of methane All the switch procedure is done automatically and is seamless for the user.

Although the invention has been described in detail with particular reference to these preferred embodiments, other embodiments can achieve the same results. Variations and modifications of the present invention will be obvious to those skilled in the art and it is intended to cover all such modifications and equivalents.

The invention claimed is:

1. A portable optical spectroscopy device for analyzing a gas sample and/or for measurement of species concentration, number density, or column density, the device comprising the following:
    a measuring chamber with the gas sample to be analyzed;
    a light source with at least one laser diode for emitting a light beam along a light path running through the measuring chamber at least in certain regions, wherein the at least one laser diode of the light source is a semiconductor laser diode, the light source disposed at a first end region of the measuring chamber;
    control circuitry configured to modulate a wavelength of the light beam emitted by the light source;
    an optical detector device disposed at a second end region of the measuring chamber, the optical detector device having a first optical detector and at least one second optical detector, the first and the at least one second optical detector being arranged with respect to the laser diode such that with the first optical detector a first part of the light emitted by the laser diode is detected after the first part of the light has passed through the measuring chamber m-times, and a second part of the light emitted by the laser diode is detected with the at least one second optical detector after the second part of the light has passed through the measuring chamber n-times, where n>m applies; and
    an evaluation unit for evaluating a signal characteristic output by the first optical detector and/or a signal characteristic output by the at least one second optical detector, the evaluation unit including signal processing electronics,
    wherein a reference cell is provided in which at least one species is contained which is to be detected in the gas sample to be analyzed, wherein the reference cell is positioned such that the first part of the light emitted by the laser diode passes through the reference cell before the first part of the light is detected by the first optical detector and such that the second part of the light emitted by the laser diode passes around the reference cell before the second part of the light is detected by the second optical detector, and
    wherein the reference cell is arranged at the second end region of the measurement chamber opposite from the light source and between the measurement chamber and the first optical detector,
    wherein a first reflector is disposed between the light source and the reference cell and is disposed at the second end region of the measurement chamber, the first reflector formed as a partially transmissive reflector such that the first part of the light passes through the measurement chamber only once and then through the first reflector and then through the reference cell before the first part of the light is detected by the first optical detector, the first reflector reflecting the second portion of the light back into the measurement chamber.

2. The device according to claim 1,
    wherein the device comprises an internal power source certified for use in potentially explosive atmospheres, said internal power source having at least one rechargeable battery and a battery enclosure for use in a hazardous area, said at least one rechargeable battery comprising a 3.65 V high energy lithium-ion cell and a protective cover in order to cover positive and negative terminals of the lithium-ion cell; and/or
    wherein the device comprises a power circuit with intrinsic safety technology for safe operation of the electrical equipment of the device in hazardous areas by limiting the energy, electrical and thermal, available for ignition.

3. The device according to claim 1, wherein the evaluation unit comprises:
    signal-processing electronics for acquiring data from the first and the at least one second optical detector and for establishing linelocking and a comparative signal source of at least one absorption feature; and
    a microcontroller receiving said data from said signal-processing electronics,
    and wherein the device additionally comprises:
        a display for displaying said data from said microcontroller, wherein said display can switch between displaying said data in PPM, percent LEL and percent gas;
        alarms controlled by said microcontroller; and/or
        a user button for inputting options and modes.

4. The device according to claim 1,
    wherein the first optical detector and/or the at least one second optical detector are/is selectively operable for harmonic detection of the light emitted by the laser diode or for direct detection of the light emitted by the laser diode; and
    wherein the evaluation unit comprises at least one phase detector for a phase-locked loop circuit allocated to the first optical detector and/or the at least one second optical detector.

5. The device according to claim 1,
wherein the at least one laser diode is adapted to selectively emit light in a first frequency spectrum or light in at least one second frequency spectrum, wherein the first frequency spectrum is matched to a first absorption line of a species to be detected in the gas sample to be analyzed, and wherein the second frequency spectrum is matched to a second absorption line of the species, wherein the first absorption line is stronger than the second absorption line.

6. The device according to claim 4, wherein the evaluation unit is operable:
in a first operating mode, in which the at least one second optical detector is operated for the harmonic detection of the light emitted by the laser diode and a signal path recorded by the at least one second optical detector is evaluated;
in a second operating mode, in which the at least one second optical detector is operated for the direct detection of the light emitted by the laser diode and the signal path recorded by the at least one second optical detector is evaluated;
in a third operating mode, in which the first optical detector is operated for the direct detection of the light emitted by the laser diode and a signal path recorded by the first optical detector is evaluated; and
in a fourth operating mode in which the at least one laser diode is driven in such a way that light emits in a frequency spectrum which is tuned to a selected absorption line of a species to be detected in the gas sample to be analyzed, wherein the selected absorption line is weaker than an absorption line, onto which the frequency spectrum of the light emitted by the at least one laser diode is in the first to third operating mode, and wherein in the fourth operating mode the at least one second optical detector is selectively operated for harmonic or direct detection of the light emitted by the at least one laser diode and the signal path recorded by the at least one second optical detector is evaluated.

7. The device according to claim 1,
wherein the at least one second optical detector is arranged such that its receiving axis runs parallel to a receiving axis of the first optical detector.

8. The device according to claim 1,
wherein a second reflector is arranged at the first end region of the measuring chamber which interacts with the first reflector arranged at the second end region of the measuring chamber such that the second part of the light emitted by the laser diode passes several times through the measuring chamber by reflecting off of the first reflector and the second reflector until the second part of the light is detected by the at least one second detector.

9. The device according to claim 1,
wherein the device is handheld and configured as a portable optical spectroscopy apparatus for measurement of gas concentration, and wherein the device can be held with a single hand.

10. The device apparatus according to claim 1,
further comprising a pump that continuously pumps the gas to be analyzed through the measuring chamber; and/or
further comprising a telescoping sample probe; and/or
further comprising a rigid probe for measurement of underground gas concentrations.

11. A portable optical spectroscopy method for measurement of species concentration, number density, or column density, the method comprising the steps of:
holding a portable optical spectroscopy device in an area to be measured, said portable optical spectroscopy device being a device according to claim 1;
emitting light from the light source of the portable optical spectroscopy device through the measuring chamber of the device;
receiving light via the first optical detector and the at least one second optical detector of the device; and
evaluating a signal characteristic output by the first optical detector and the at least one second optical detector of the device;
wherein the device has a plurality of operational modes measuring a same absorption feature or different absorption features of the species, and wherein said device switches between modes depending on measured absorbance.

12. The method according to claim 11, wherein:
a first operational mode is selected from the group consisting of wavelength modulation spectroscopy, frequency modulation spectroscopy, two-tone frequency modulation spectroscopy, cavity ringdown spectroscopy, and rapid-scan direct absorption spectroscopy;
a second operational mode determines absorbance from a measurement of width of the absorption feature;
a third operational mode comprises direct absorption spectroscopy;
a fourth operational mode determines absorbance from a measurement of width of the absorption feature performed by the first optical detector and the at least one second optical detector; and
a fifth operational mode determines absorbance from a measurement of width of the at least one absorption feature at different wavelengths tuned to different absorption lines of a species to be detected in the gas sample.

13. The device according to claim 1, wherein the laser diode is a vertical-cavity surface-emitting laser diode.

14. The device according to claim 1, wherein the species to be detected in the gas sample to be analyzed is methane gas.

15. The device according to claim 1, wherein the wavelength of the light beam emitted by the light source is controllably modulated by periodic oscillation of current applied to the laser diode by the control circuitry.

16. A portable optical spectroscopy device for analyzing a gas sample and/or for measurement of species concentration, number density, or column density, the device comprising the following:
a measuring chamber with the gas sample to be analyzed;
a light source with at least one laser diode for emitting a light beam along a light path running through the measuring chamber at least in certain regions, wherein the at least one laser diode of the light source is a low-power semiconductor laser diode, the light source disposed at a first end region of the measuring chamber;
control circuitry configured to modulate a wavelength of the light beam emitted by the light source;
an optical detector device disposed at a second end region of the measuring chamber, the optical detector device having a first optical detector and at least one second optical detector, the first and the at least one second optical detector being arranged with respect to the laser diode such that with the first optical detector first part of the light emitted by the laser diode is detected after the light has passed through the measuring chamber m times, and a second part of the light emitted by the laser diode is detected with the at least one second optical detector after the light has passed through the measuring chamber n times, where n >m;

an evaluation unit for evaluating a signal characteristic output by the first optical detector and/or a signal characteristic output by the at least one second optical detector, wherein at least one of the first optical detector and the at least one second optical detector is configured to selectively operate in either a first mode capable of harmonic detection of the light emitted by the laser diode or a second mode capable of direct detection of the light emitted by the laser diode, the evaluation unit including signal processing electronics; and a reference cell arranged at the second end region of the measurement chamber opposite from the light source and between the measurement chamber and the first optical detector, the reference cell containing at least one species which is to be detected in the gas sample to be analyzed, wherein the reference cell is positioned such that the first part of the light emitted by the laser diode passes through the reference cell before the first part of the light is detected by the first optical detector and such that the second part of the light emitted by the laser diode passes around the reference cell before the second part of the light is detected by the second optical detector;

a partially transmissive reflector disposed between the light source and the reference cell and disposed at the second end region of the measurement chamber, the partially transmissive reflector formed such that the first part of the light passes through the measurement chamber and then through the partially transmissive reflector and then through the reference cell before the first part of the light is detected by the first optical detector, wherein the evaluation unit comprises at least one phase detector for a phase-locked loop circuit allocated to the first optical detector and/or the at least one second optical detector, and wherein the at least one of the first optical detector and the at least one second optical detector is operated in either the first mode or the second mode based on an absorbance of the gas sample to be analyzed.

17. The device of claim 1, further comprising:
a telescoping sample probe.

* * * * *